US006531023B1

(12) United States Patent
Barry

(10) Patent No.: US 6,531,023 B1
(45) Date of Patent: Mar. 11, 2003

(54) PART-OVERLAMINATED LABEL

(75) Inventor: David R Barry, St. Louis, MO (US)

(73) Assignee: Inprint Systems, Inc., St. Charles, MO (US)

(*) Notice: Subject to any disclaimer, the term of this patent is extended or adjusted under 35 U.S.C. 154(b) by 189 days.

(21) Appl. No.: 09/714,451

(22) Filed: Nov. 17, 2000

Related U.S. Application Data

(62) Division of application No. 09/175,367, filed on Oct. 20, 1998, now Pat. No. 6,306,476.

(51) Int. Cl.[7] .......................... B32B 31/00; B32B 31/18; B32B 31/10; G09F 3/02; B42D 15/00

(52) U.S. Cl. ........................ 156/256; 156/247; 156/248; 156/257; 156/268; 156/300; 156/303; 428/40.1; 428/41.7; 428/42.3; 283/81; 283/101; 283/107

(58) Field of Search ................................ 156/247, 248, 156/250, 253, 256, 257, 268, 261, 290, 291, 299, 300, 301, 303; 428/40.1, 41.7, 41.8, 42.1, 42.2, 42.3, 194, 914; 283/81, 100, 101, 107, 36; 291/2, 5

(56) References Cited

U.S. PATENT DOCUMENTS 4,529,229 A 7/1985 Glibbery
5,021,110 A * 6/1991 Kobayashi .................. 156/249
5,399,403 A 3/1995 Instance
5,466,321 A * 11/1995 Miyaji ........................ 156/260
5,700,537 A * 12/1997 Instance .................... 428/41.9
5,766,716 A * 6/1998 Barry ......................... 428/40.1
5,804,271 A 9/1998 Barry
5,863,628 A * 1/1999 Barry ......................... 428/40.1
6,057,019 A * 5/2000 Barry ......................... 428/40.1

FOREIGN PATENT DOCUMENTS

| | | |
|---|---|---|
| WO | 9704433 | 2/1997 |
| WO | 9807131 | 2/1998 |
| WO | 9807132 | 2/1998 |
| WO | 9807133 | 2/1998 |

* cited by examiner

*Primary Examiner*—J. A. Lorengo
(74) *Attorney, Agent, or Firm*—Rothwell, Figg, Ernst & Manbeck

(57) ABSTRACT

A method of producing a succession of self-adhesive labels carried on a backing of release material including the steps of; a) providing an elongate web comprising a self-adhesive support web having a backing of release material; b) die-cutting and removing from the backing of release material a succession of portions of the support web; c) adhering a succession of multilaminar label portions to the succession of intermediate parts of the support web; and d) adhering a succession of portions of a self-adhesive overlaminate to the upper surface of the succession of multilaminar label portions so that each portion of the overlaminate substantially covers the respective multilaminar label portion and a respective portion of the backing of release material which is adjacent to the respective multilaminar label portion, the second portion of the upper surface of each intermediate part of the support web being left substantially uncovered by the overlaminate.

11 Claims, 5 Drawing Sheets

PART-OVERLAMINATED LABEL

This application is a division of application Ser. No. 09/175,367, filed on Oct. 20, 1998, now U.S. Pat. No. 6,306,476.

BACKGROUND TO THE INVENTION

1. Field of the Invention

The present invention relates to self-adhesive labels and to a method of producing self-adhesive labels. In particular, the present invention relates to self-adhesive labels of multilaminar construction in which the label incorporates a booklet or folded sheet so as to provide a large surface area for carrying printed information which is greater than the surface area of the footprint of the label. The labels of the present invention have particular application in the labelling of pharmaceutical products.

2. Discussion of the Prior Art

A variety of so-called leaflet labels or booklet labels are known in the art and a typical label construction is disclosed in U.S. Pat. No. 5,399,403 in the name of David J. Instance. It is well known for the folded Leaflet or booklet to be overlaminated with a self-adhesive transparent plastics layer. The overlaminate provides durability to the label against inadvertent damage or tearing and also improves the aesthetic appearance of the label. Furthermore, the overlaminate can provide a structural part of the label to enable the leaflet or booklet label to be opened from a closed configuration by pulling the overlaminate away from a surface of a product, such as a pharmaceutical container, which is labelled to enable the leaflet or booklet to be read by a user. In some labels, the overlaminate can be re-adhered to the product to return the label to its closed configuration. Typical plastics materials for use as the overlaminate include oriented polypropylene carrying a pressure-sensitive adhesive on its rear surface.

U.S. Pat. No. 4,529,229 discloses a self-adhesive label in which an adhesive strip is provided to retain a folded strip in its folded configuration by being adhered to a top label and an underlying panel of the strip.

when pharmaceutical products are labelled, it is often necessary for the label to be printed with specific information, such as a lot of batch code and an expiry date. Such printing is generally achieved by providing a generic printed label for a particular pharmaceutical product and then overprinting a series of the labels with the required batch or lot code and expiry date.

A technical problem exists in the art in that there is a need to provide on overlaminated leaflet or booklet labels an area which is suitable for being printed with high quality alphanumeric printing devices suitable for printing batch codes, expiry dates and the like. There is also a need in the art for such overlaminated labels, particularly for pharmaceutical products, to be overprinted with bar codes which contain information relating to the overprinted batch codes, expiry dates, etc. and act as a security feature which can be scanned automatically to check that the required overprinting has been effected. The bar code needs to be small in area yet accurately printed in order to be machine readable at high speeds.

When information is overprinted onto paper, i.e. when a non-overlaminated leaflet or booklet label is being printed, ink is printed onto the paper surface of the label and then a laser is employed either to vaporise some of the ink so as to leave white lettering surrounded by the ink or to burn the lettering into the surface of the paper. The present inventor has attempted to replicate this laser printing process onto a plastics overlaminate, in particular an oriented polypropylene self-adhesive laminate. However, following laser treatment the appearance of the printing is poor because the laminate tends to have a bubble effect imparted thereto by the laser, which the present inventor believes results from vapours being emitted from the paper surface and thermal distortion of the plastics laminate. In addition, it is believed that the overlaminate absorbs some of the energy from the laser which may require the utilisation of a relatively powerful laser, or a longer burn time, which may in turn exacerbate the bubbling problem.

The present inventor has also attempted to overprint onto a plastics overlaminate by using a thermal transfer printer. Such thermal transfer printers use a multi-element print head with a large number of tiny heating elements that can be turned on and off in a desired pattern or configuration under computer control so as to print selected alphanumeric characters. A ribbon is pressed between the print head and the substrate to be printed and when the print head elements are turned on so as to become heated, the elements soften the coating on the surface of the ribbon in contact with the substrate allowing the coating to stick to the substrate as a pattern of dots. The desired alphanumeric symbols to be printed are of course controlled by selectively activating the desired pattern of heating elements. The present inventor has discovered that the plastics overlaminate surface tends not to be receptive to some thermal transfer coatings.

There is also a desire to overprint by means of wet printing. In wet printing a liquid vehicle of a wet printing ink dries by absorption into the printed substrate. This is not possible with a plastics overlaminate because the vehicle cannot absorb thereinto, leading to smudging of the printed image.

These problems have been solved in the prior art by adhering a self-adhesive overlabel to the upper surface of the overlaminate, which overlabel has an upper surface which can be printed on by at least one of laser printing and thermal transfer printing. Such a construction is disclosed in WO98/07133 in the name of David J Instance Limited. However, this solution necessarily results in increased material costs due to the need to provide extra material for the overlabel and increased production costs due to the need for an extra production step to apply the overlabel to the upper surface of the overlaminate.

WO 97/04433, WO98/07131 and WO98/07132 disclose other types of over-laminated leaflet labels It is therefore an object of the present invention to at least partially solve these problems of the prior art.

SUMMARY OF THE INVENTION

The present invention provides a self-adhesive label carried on a backing of release material, the label comprising;

- a self-adhesive support piece which is releasably adhered to the backing;
- a multi-laminar label portion adhered to a first portion of an upper surface of the support piece, a second portion of the upper surface of the support piece adjacent the first portion being left uncovered by the multi-laminar label portion; and
- a self adhesive over-laminate adhered to an upper surface of the multi-laminar label portion so as substantially to cover the multi-laminar label portion and to a portion of the hacking of release material adjacent to the multilaminar label portion thereby to retain the multi-laminar label portion in a closed configuration, and wherein the second portion of the upper surface of the support piece is left substantially uncovered by the over-laminate.

The ability to efficiently produce labels in large numbers is often an important requirement- It is therefore a further object of the present invention to provide a method for producing a succession of self-adhesive labels according to the present invention by which large numbers of self-adhesive labels according to the present invention can be produced efficiently with a minimum number of production steps.

The present invention therefore further provides a method for producing a succession of self-adhesive labels carried on a backing of release material according to the present invention, said method comprising the steps of;

at providing an elongate web comprising a self-adhesive support web having a backing of release material;

b) die-cutting and removing from the backing of release material a succession of portions of the support web to leave a succession of intermediate parts of the support web longitudinally spaced along the backing of release material;

c) adhering a succession of multi-laminar label portions to the succession of intermediate parts of the support web, each multi-laminar label portion being adhered to a first portion of an upper surface of the respective intermediate part of the support web, a second portion of the upper surface of the intermediate part of the support web adjacent to the first portion being left uncovered by the multi-laminar label portion; and d) adhering a succession of portions of a self-adhesive over-laminate to the upper surface of the succession of multi-laminar label portions so that each portion of the over-laminate substantially covers the respective multi-laminar label portion and a respective portion of the backing of release material which is adjacent to the respective multi-laminar label portion thereby to retain the multi-laminar label portion in a closed configuration, the second portion of the upper surface of each intermediate part of the support web being left substantially uncovered by the over-laminate.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENTS

Figure 1:
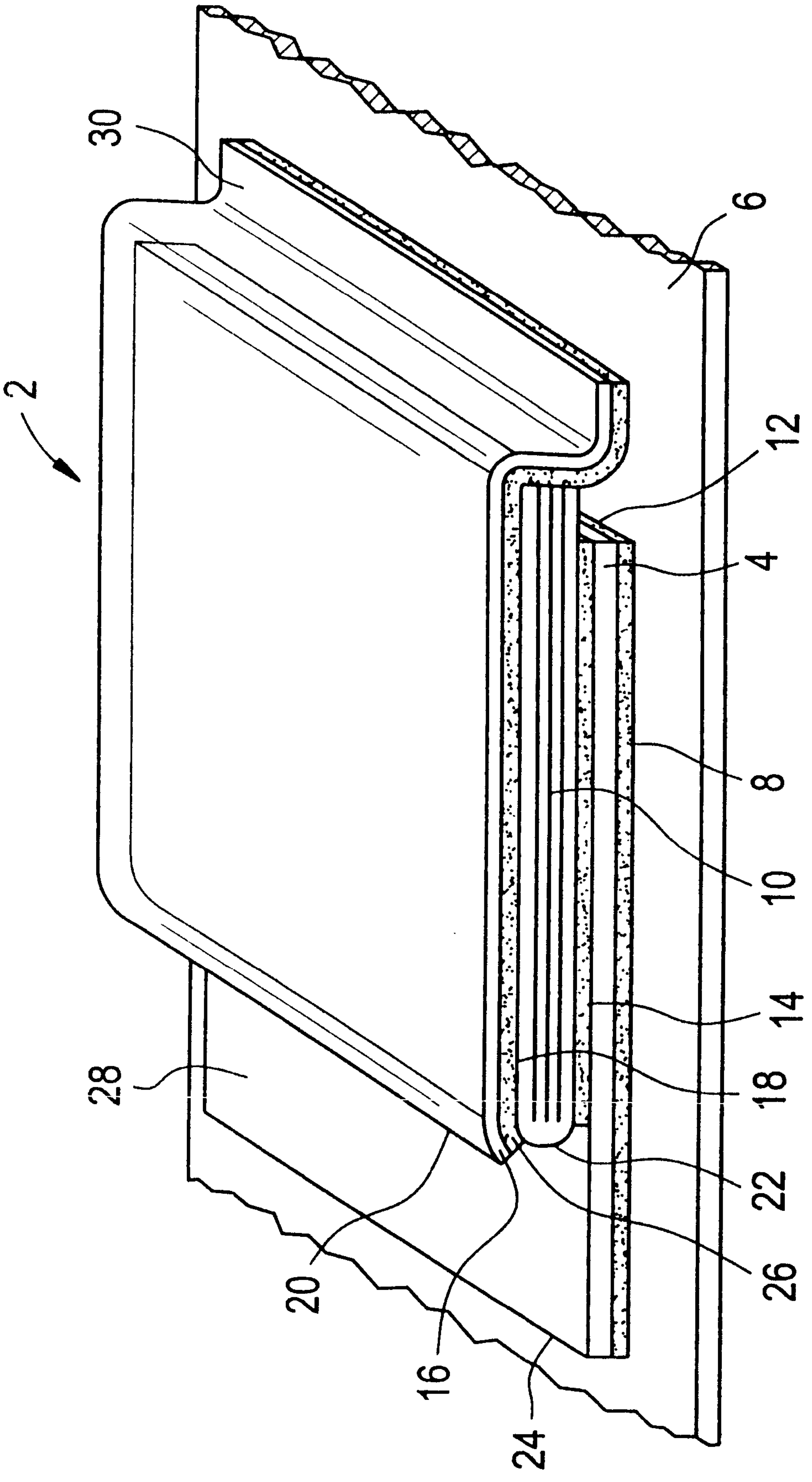
FIG. 1 shows a perspective view of a self-adhesive label according to a first embodiment of the present invention

Referring to FIG. 1, there is shown a perspective view of a self-adhesive label according to a first embodiment of the present invention. The self-adhesive label, designated generally as 2, comprises an underlying support piece 4 which is adhered to a web of release backing material 6 by a layer of pressure-sensitive adhesive a on the rear surface thereof.

A booklet 10 is adhered to a first portion of the support piece 4 adjacent transverse edge 12 by a layer of permanent adhesive 14. A plastic transparent over-laminate 16 is adhered to the upper surface 18 of the booklet 10 by its underlying layer of pressure-sensitive adhesive 26. The left transverse edge 20 of the over-laminate coincides with the spine 22 of the booklet 10.

The portion 28 of the upper surface of the Support piece adjacent the left transverse edge 24 thereof id left uncovered by both the booklet 10 and the over-laminate 16 and is therefore available for being printed on by, for example, laser printing or thermal transfer printing.

The over-laminate 16 has a region 30 which is adhered directly to the release backing material 6. This region 30 of the overlaminate 16 ensures that the booklet 10 is held in its folded configuration by the adhesion of the over-laminate region 30 to the release backing material 6.

In use, the self-adhesive label is adhered to the surface of a product to be labelled, typically a curved container. When it is desired to open the label, a user manually peels the region 30 of the over-laminate 16 which is releaseably adhered to the container surface away from the surface of the container so that the booklet 10 may be opened and read by a user. After use, the label may be returned to its closed configuration by adhering the over-laminate region 30 again by its self-adhesive surface to the container.

Figure 2:
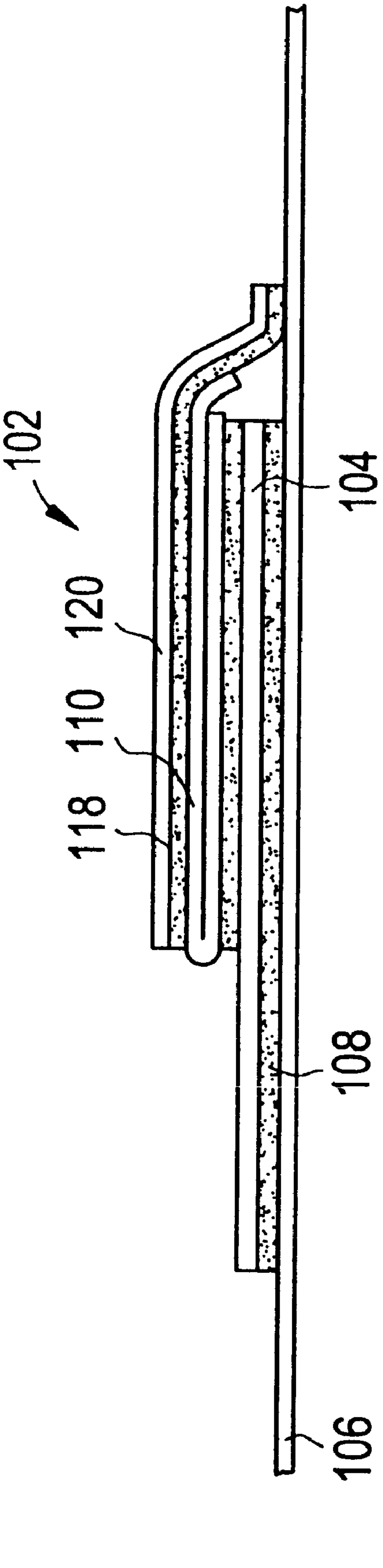
FIG. 2 shows a side view of a self-adhesive label according to a second embodiment of the present invention.

Referring to FIG. 2, there is shown a side-view of a self-adhesive label according to a second embodiment of the present invention. This self-adhesive label is identical to that shown in FIG. 1 except that a leaflet 110 is employed instead of a booklet.

Next, a method of producing a succession of self-adhesive labels according to a third embodiment of the present invention shall be described with reference to FIG. 3 and FIGS. 4 and 5.

An elongate web 300 comprising a support web releaseably adhered to a backing of release material 206 by a layer of pressure-sensitive adhesive 208 on the underlying surface thereof. A longitudinal section of the elongate web 300 is shown in FIG. 3. In a first step, the support web is die-cut without cutting through the backing of release material. A succession of transverse columns of rectangular shapes 302 is cut into the support web, and the portions of the support web defined by these shapes are removed from the backing simultaneously with die-cutting to leave a succession of three-up columns of rectangular windows 304 in the support web through which the backing of release material 206 is exposed. As will be evident to the skilled person, the portions of support web defined by the rectangular shapes 302 could also be removed in a separate step after die-cutting.

It will also be apparent to the skilled person that the rectangular windows 304 do not have to be arranged in transverse columns of three as shown in the drawings, but could alternatively be arranged in columns of any other number depending, amongst other things, on the size of the resultant labels.

The left edge 306 of each rectangular window 304 formed in the support web defines the right transverse edge of an intermediate part (350) of the support web, and the right edge 308 of each rectangular window 304 defines the left transverse edge 224 of an adjacent intermediate part (350) of the support web. Each column of rectangular windows 304 therefore defines the right transverse edge of a transverse column of three intermediate parts (350) of the support web, and the left transverse edge of an adjacent transverse column of three intermediate parts (350) of the support web.

The term "intermediate part" refers to the portion of the support web which will form the support piece (204) in the respective final label. At this stage of production, in this preferred embodiment of the method of the present invention the intermediate parts are connected in the transverse direction by interconnecting portions of the support web, and are only separated from each other in the final die-cutting step which is described below.

A gutter 310 of support web is left between each rectangular window 304 in any transverse column.

The next step is to apply a succession of booklet strips 312 to the support web, one booklet strip 312 for each transverse column of intermediate parts (350) of the support web. The outline of the booklet strips 312 is shown by the short-dash line in FIG. 3. Since the intermediate parts (350) are arranged in transverse columns of three, each booklet strip 312 also comprises a continuous strip of three booklets 210, one for each intermediate part (350) in a single column. Each booklet strip is arranged on the support web such that each individual booklet 210 in the booklet strip 3312 lines up with the respective intermediate part (350) in the respective transverse column, and such that the right edge 314 of the upper sheet of the booklet strip 312 extends partially over the rectangular windows 304 created in the support web. Each booklet strip 312 is applied to the support web by a layer of permanent adhesive 214. The booklet strips 312 are of such width that they do not occupy the whole area of the upper surface of the intermediate parts (350) in the respective transverse column but leave a left-hand portion 228 of the upper surface of each intermediate part 350 in the respective transverse column uncovered.

The upper sheet of each booklet composing the booklet strip is provided with a tab portion 340 protruding from its right edge 316 and extending over the respective rectangular window 304 formed in the support web Par of this tab portion 340 remains as a tab 240 in the finished label and facilitates the opening of each booklet 210 in the finished label.

Although not a feature of the embodiment shown in the Figures, the booklet strip can be folded in half widthwise before applying it to the support web by doing so, the area occupied by each booklet on the respective support piece in the final label can be reduced by half, whereby a support piece of reduced area can be employed, or the area of the support piece available for subsequent printing can be increased for a support piece of given area.

The next step is to apply a succession of transverse strips 318 of self-adhesive transparent plastics over-laminate, one for each booklet strip 312. A transverse strip 318 of specified width is applied over the full length of each booklet strip 312 and adhered to the upper surface of the respective booklet strip 312 by its underlying layer of pressure-sensitive adhesive 226. The outline of the over-laminate strips 318 are shown by the long-dash lines in FIG. 3. Each over-laminate strip 318 is arranged on the respective booklet strip such that its right transverse edge 320 finishes approximately level with the right edge 322 of the tab portions 340 protruding from the upper sheet of the respective booklet strip 312. The width of the overlaminate strip 318 is such that its left edge 324 lies slightly to the right of the spine 326 of the booklet strip 312.

Figure 3:
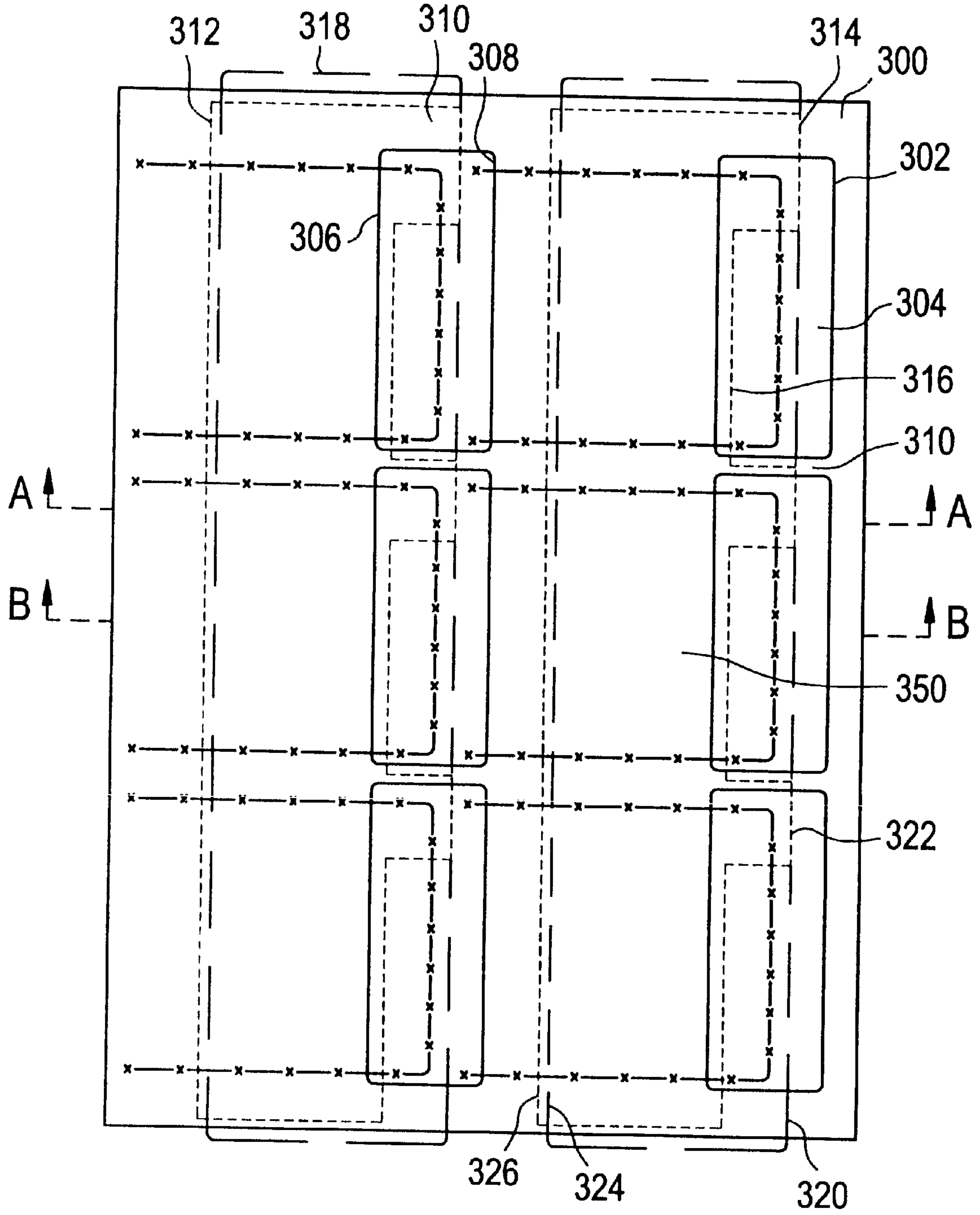
FIG. 3 shows an overhead view of a succession of self-adhesive labels according to a third embodiment of the present invention in an intermediate stage of their production according to a method of the present invention.

The final step is to die-cut along the U-shaped line shown by the crossed-line in FIG. 3. The final cut die thus cuts through the booklet strip 312 and overlaminate strip 318, as well as through the support web to define the top and bottom longitudinal edges of each label, and cuts though the booklet strip 312 and overlaminate strip 318 to define the right transverse edge of each label.

The corners of the U-shaped die are rounded whereby the top-right right and bottom-right corners of each resultant label are also rounded.

The right-hand edge 308 of each rectangular window 304 that was originally cut out of the support web becomes the left edge 224 of the respective finished label. There is therefore no support web between the left and right transverse edges of longitudinally adjacent labels that has to be taken up with the unwanted matrix of support web.

The longitudinally-extending gutters 310 of support web left deliberately between the rectangular windows 304 la the pre-die-cutting step have the result that the matrix of waste support web to be removed from the backing of release material is continuous in the longitudinal direction and can therefore be removed easily from the backing of release material. This removal of the waste matrix is further facilitated by the reinforcing effect of the over-laminate on these sections of the support web.

The portion 228 of the upper surface of each label to the left of the spine 222 of its booklet 2310 remains uncovered by the overlaminate 216 t is therefore available for laser coding or another alternative method of printing such as thermal transfer printing without the need to apply an overlabel.

Figure 4:
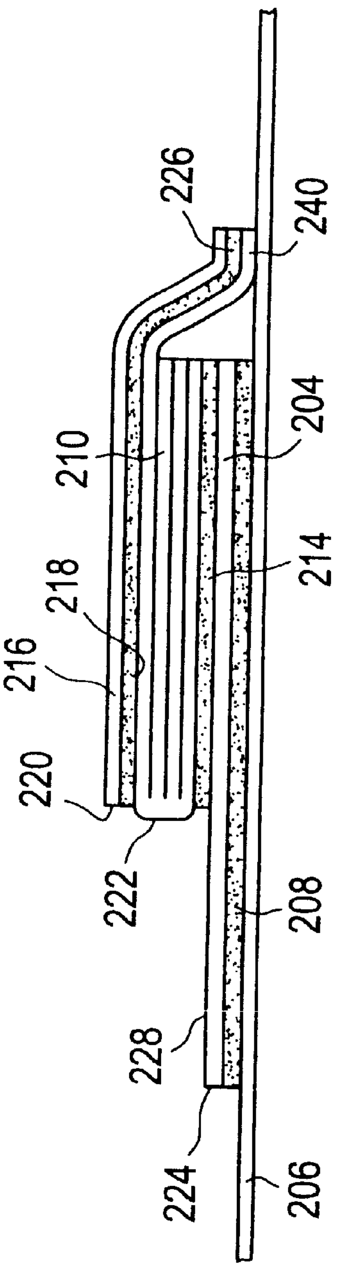
FIG. 4 shows a cross-section of a self-adhesive label shown in FIG. 3 after final die-cutting taken through line A—A— in FIG. 3.
Figure 5:
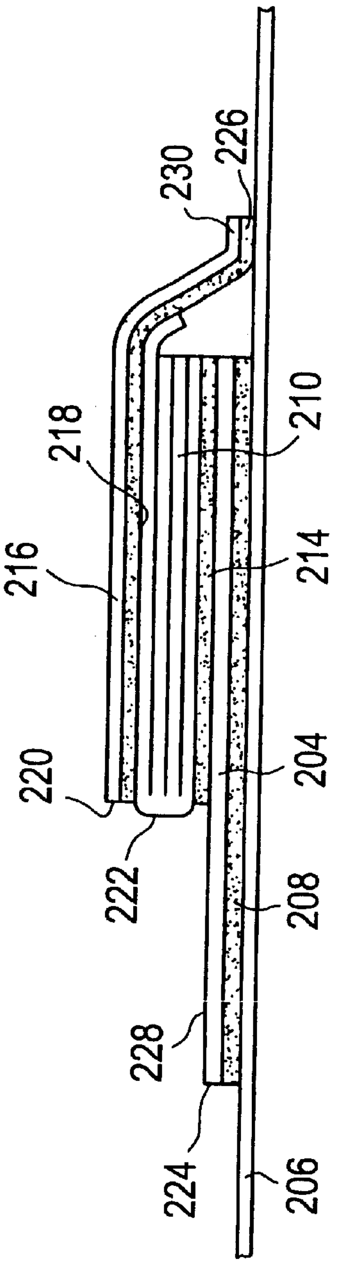
FIG. 5 shows a cross-section of a self-adhesive label shown in FIG. 3 after final die-cutting taken through line B—B in FIG. 3.

The resultant self-adhesive label after final die-cutting is shown in FIGS. 4 and 5 as cross-sections taken through line A—A— and line B—B of FIG. 3, respectively.

In use, the self-adhesive label is adhered to the surface of a product to be labelled, typically a curved container When it is desired to open the label, a user manually grabs the tab 240 which is not adhered to the container surface directly and the tab 240 is pulled away from the container thereby to pull the over-laminate region away from adhesive contact with the surface of the container so that the booklet 210 may be opened and read by a user. After use, the label may be returned to its closed configuration by adhering the over-laminate region 230 again by its self-adhesive surface to the container.

Figure 6:
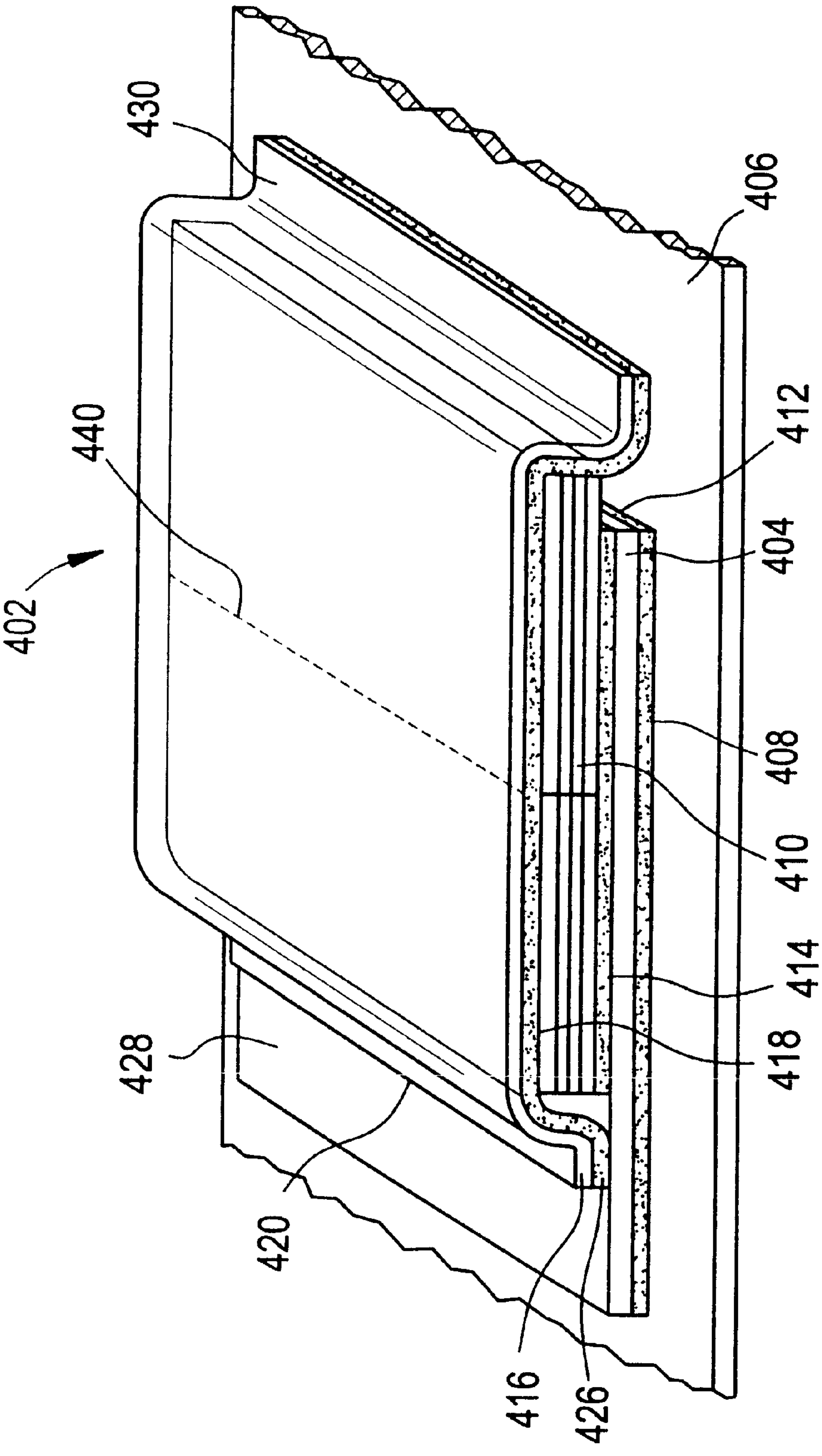
FIG. 6 shows a perspective view of a self-adhesive label according to a fourth embodiment of the present invention.

Referring to FIG. 6, there is shown a perspective view of a self-adhesive label according to a fourth embodiment of the present invention. This self-adhesive label is similar to that shown in FIG. 1. However, in this embodiment, the booklet 410 is arranged on the first portion of the upper surface of the support piece 404 adjacent transverse edge 412 in art unfolded configuration (the spine of the booklet is shown by the dashed line 440) and is only temporarily held on the first portion of the upper surf ace of the support piece 404 by a layer of a removable adhesive 414. The plastic transparent overlaminate 416 is adhered to the upper surface 418 of the unfolded booklet 4310, and extends beyond the left transverse edge of the unfolded booklet 410 such that a region of the overlaminate 416 is adhered to a part of the second portion 428 of the support piece 404 uncovered by the booklet 410 whilst still leaving a substantial part of the second portion 428 of the support piece 404 uncovered by both the booklet 410 and overlaminate 416, and therefore available for subsequent printing. The overlaminate 4316 is adhered to the second portion 428 of the support piece to an extent sufficient to securely hold the booklet 410/overlaminate 416 assembly on the support piece 404.

In use, the self-adhesive label is adhered to the surface of a product to be labelled, usually a curved container. When it is desired to open the label, a user manually peels the region 430 of the overlaminate 416 which is releasably adhered to the container surface away from the surface of the container, and also lifts the unfolded booklet 410 from the first portion of the upper surface of the support piece 404 so that the pages of the booklet 4101 can be turned and read. After use, the label is returned to its closed configuration by adhering the overlaminate region 430 again by its self-adhesive surface to the container.

In this embodiment, the booklet 4101 is only permanently attached to the support piece 404 via the overlaminate 416. The adhesion of the overlaminate to the second portion 428 of the support piece 404 therefore prevents the left edge of the booklet from falling open when the label is closed and prevents the booklet from becoming completely detached from the label when the label is opened.

As will be clear to the skilled person, the layer of removable adhesive 4314 shown in FIG. 6 only serves to temporarily hold the unfolded booklet 410 in place on the support piece 404 until the overlaminate 4116 is applied in view of this function of the layer of removable adhesive 414, it will also be clear to the skilled person that it is equally possible to alternatively use only a couple of dots of removable adhesive to temporarily adhere the unfolded booklet 410 to the first portion of the upper surface of the support piece 404, or to provide the temporary adhesion by means of electrostatic charge or some similar transitory mechanism rather than by using a removable adhesive In fact, this will be advantageous since the booklet 410 will be more readily liftable from the first portion of the support piece when the label is opened to read the booklet.

A succession of the above-described self-adhesive labels according to the fourth embodiment can be produced by the method described earlier with appropriate modifications thereto in accordance with the modifications in construction.

What is claimed is:

1. A method of producing a succession of self-adhesive labels carried on a backing of release material, the method comprising the steps of:

a) providing an elongate web comprising a self-adhesive support web having a backing of release material;

b) die-cutting and removing from the backing of release material a succession of portions of the support web to leave a succession of intermediate parts of the support web longitudinally spaced along the backing of release material;

c) adhering a succession of multilaminar label portions to the succession of intermediate parts of the support web, each multilaminar label portion being adhered to a first portion of an upper surface of the respective intermediate part of the support web, a second portion of the upper surface of the intermediate part of the support web adjacent to the first portion being left uncovered by the multilaminar label portion;

d) adhering a succession of portions of a self-adhesive overlaminate to the upper surface of the succession of multilaminar label portions so that each portion of the overlaminate substantially covers the respective multilaminar label portion and a respective portion of the backing of release material which is adjacent to the respective multilaminar label portion thereby to retain the multilaminar label portion in a closed configuration, the second portion of the upper surface of each intermediate part of the support web being left substantially uncovered by the overlaminate.

2. A method according to claim 1, further comprising the step, after step d), of further die-cutting through each overlaminate, each multilaminar label portion and the support web to define longitudinal edges of the self-adhesive label and a first transverse edge of the self-adhesive label which is opposite to a second transverse edge thereof which is defined by the second portion of the upper surface of the intermediate part of the support web.

3. A method according to claim 1, wherein the upper surface of the support web is printable by at least one of laser printing and thermal transfer printing.

4. A method according to claim 1, wherein the multilaminar label portion is selected from the group consisting of a folded leaflet and a booklet.

5. A method according to claim 1, wherein a transverse edge of the overlaminate adjacent the second portion of the upper surface of the intermediate part of the support web coincides approximately with a transverse edge of the multilaminar label portion adjacent the second portion of the upper surface of the intermediate part of the support web.

6. A method according to claim 1, wherein the intermediate parts of the support web are arranged on the backing of release material in a series of columns, each column extending in the transverse direction of the support web and comprising a plurality of intermediate parts of the support web.

7. A method according to claim 6, wherein the multilaminar label portions and overlaminate portions applied to the plurality of the intermediate parts of support web in a single column are applied as continuous strips which extend over the full height of the column.

8. A method according to claim 2, wherein a U-shaped die is used to define the longitudinal edges and the first transverse edge.

9. The method according to claim 8, wherein the corners of the U-shaped die are rounded.

10. The method according to claim 1 or claim 6, wherein a matrix of the support web surrounds each of the intermediate parts, the matrix of support web being continuous in the longitudinal direction of the support web.

11. A method of producing a succession of self-adhesive labels carried on a backing of release material, the method comprising the steps of;

a) providing an elongate web comprising a self-adhesive support web having a backing of release material;

b) die-cutting and removing from the backing of release material a succession of portions of the support web to leave a succession of transverse columns of intermediate parts of the support web longitudinally spaced along the backing of release material, the intermediate parts in each column being connected in the transverse direction by interconnecting parts of the support web which are continuous in the longitudinal direction of the support web;

c) adhering a succession of multilaminar label portion strips to the succession of transverse columns of intermediate parts of the support web, each multilaminar label portion strip comprising a plurality of multilaminar label portions, each multilaminar label portion being adhered to a first portion of an upper surface of the respective intermediate part of the support web, a second portion of the upper surface of the intermediate part of the support web adjacent to the first portion being left uncovered by the multilaminar label portion;

d) adhering a succession of self-adhesive overlaminate strips to the upper surface of the succession of multilaminar label portion strips so that the overlaminate strip substantially covers the multilaminar label portions of the respective multilaminar label portion strip and overlaps with respective portions of the backing of release material which are adjacent to the respective multilaminar label portions of the respective multilaminar label portion strip thereby to retain the multilaminar label portions in a closed configuration, the second portion of the upper surface of each intermediate part of the support web being left substantially uncovered by the overlaminate strip; and e) further die-cutting through each overlaminate strip, each multilaminar label portion strip and the support web to define longitudinal edges of the self-adhesive labels and a first transverse edge of the self-adhesive labels which is opposite to a second transverse edge thereof which is defined by the second portion of the upper surface of the intermediate part of the support web.

* * * * *